June 20, 1972    J. PAYMAL    3,671,355
CONTINUOUS PRODUCTION OF COMPOSITE PANELS, PARTICULARLY
FOR BUILDINGS
Filed Aug. 12, 1968    5 Sheets-Sheet 1

Fig. 1.

INVENTOR
JEAN PAYMAL
BY Samuel Klomp
ATTORNEY

Fig. 5.

INVENTOR
JEAN PAYMAL

United States Patent Office 3,671,355
Patented June 20, 1972

3,671,355
CONTINUOUS PRODUCTION OF COMPOSITE
PANELS, PARTICULARLY FOR BUILDINGS
Jean Paymal, Clermont, France, assignor to Compagnie
de Saint-Gobain, Neuilly-sur-Seine, France
Filed Aug. 12, 1968, Ser. No. 752,043
Claims priority, application France, Aug. 18, 1967,
118,250
Int. Cl. C09j 5/00
U.S. Cl. 156—324
16 Claims

ABSTRACT OF THE DISCLOSURE

The continuous production of composite structural panels embodying a continuous core of cellular organic or mineral material, covered on one or more faces and edges thereof with a sheet of heat-hardenable resinous material, preferably reenforced with mineral fibrous material, which is pregelified before its application to the core, and which is subsequently joined to the latter by pressing them together while the resinous material undergoes final polymerization and hardening, preparatory to the controlled cooling thereof and cutting into panels of desired length. The facing layer for all surfaces of the panel may be a unitary one having an original width which is at least as great as the perimeter of the section of the finished panel. Composite structural panels particularly suitable for walls, flooring and partitions may be formed with a facing of ceramic material on one surface of the core, and a sheathing layer of resin and reenforcement therefor encompassing the other three surfaces thereof and adhering to the borders at the underside of the ceramic facing layer. Many improvements in the composite panel and in the mode of manufacture thereof are attained by interposing an intermediate layer of flexible material, such as a foam resin, between the core and the facing layers of the panel.

---

The present invention relates to the manufacture of composite panels designed particularly for the construction of buildings, and which are formed of a prefabricated core of cellular organic or mineral material endowed with good insulating properties, especially heat insulating characteristics, and covered on one of its surfaces, or preferably on both surfaces, and possibly on the sides as well, with a plastic material, which is in particular heat-hardening, and which advantageously may be reenforced by fibers, especially glass fibers. The cellular material may be a polyurethane foam, polyester, or even a phenolic foam, or any other rigid organic foam with a predetermined resistance to compression and shearing. The cellular material may also be an insulating mineral, such as glass foam, or a composition constituted by expanded agglomerated mineral products. The facing material itself may be constituted advantageously by a laminated product of polyester or epoxy resin reenforced by a mat or cloth of glass or by long glass fibers, or still, by one or more screens or netting of glass fibers.

The principal difficulties generally encountered in the production of composite panels of this type, arise from the stresses which develop in the cellular material or foam, in the proximity of the foam-and-sheathing interface. These stresses have a double origin, and arise, on the one hand, by the shrinking of materials during polymerization, and on the other hand, by the thermal shrinking in consequence of the cooling from the temperature at which is attained the adherence between the sheathing or facing and the foam core.

The following procedure in accordance with the invention serves to eliminate these difficulties. It consists in preparing the facings in advance, by bringing the resin constituting them to a certain degree of gelification, before placing the facings in contact with the previously fabricated band of cellular material, and exerting a pressure perpendicular to the surface of adherence of the facings and band, so as to encourage relaxation of the stresses which appear in the plane of the facings at the moment of polymerization of their constitutent material. This procedure renders the shrinkage of polymerization in the longitudinal and transverse directions sufficiently weak as to not give rise to stresses encouraging shearing of the cellular material.

According to another characteristic of the invention, the band of cellular material is heated before putting it in contact with the facings. This preliminary heating enhances the adherence between the two materials, and diminishes the stresses capable of appearing in the composite product during its final cooling. The improved adherence arises from better wetting of the band of cellular material by the resin due to lowering of viscosity of the layer of heated resin in the phase preceding its hardening.

According to another characteristic of the invention, a controlled cooling of the product is exercised, so that the lowering of temperature after polymerization is first slow, then very much faster in the final phase.

In the case where the resistance to compression of the cellular material is high, that is, in the case where its elasticity does not permit it to compensate for a poor tolerance in thickness, it may be advantageous to provide a corrective machining of the surface, thereby obtaining good smoothness at the same time as excellent uniformity in thickness of the product. This operation may be preferable in the case where a rigid pressing device is used.

If the surface of the band of cellular material has a tendency to be rough and slightly dusty, as for example in the case of a phenolic foam, it may be useful to atomize lightly a suitable resin onto the band, before application of the sheathings. The nature of resin thus projected, may be the same as that which constitutes the facings.

It is also an object of the invention to provide an apparatus for executing the process described above. This apparatus comprises essentially a device for continuously supplying the band of cellular material, a heating chamber for heating said band, devices for supplying the facing or facings with pregelification heaters, a pressing system constituted particularly by two endless metallic cloth covers, in order to apply the facing or facings against the cellular band under pressure, and heating and cooling devices located in the last-mentioned compression zone. It is desirable that the band and facings contact and take hold progressively in order to eliminate enclosed air in the pregelified resin as well as in the cellular material of the central core.

It is another object of the invention to cover the above-mentioned prefabricated central core of cellular organic or mineral material in the form of a continuous band or in the form of a series of sections of great length, on both surfaces, as well as the sides thereof, by a unitary facing, which is formed originally of a width at least as great as the perimeter of the section of the finished panel. This mode of facing the cellular core in its entirety on both its large surfaces and its edges by the same sheathing, may be executed facilely by forming the integral facing sheet in a horizontal plane by the impregnation of a mat or netting of fibers, particularly glass fibers, with a resin which may be pregelified, and then reversing and guiding this sheet in such a manner that it will assume the shape of an inverted U in section, and advancing the sheet thus shaped in position to cap the top edge of the above-mentioned central core of cellular material, which is fed on edge in a vertical plane, at the same time turning down the two branches of the U onto the opposite large surfaces of the central core of cellular material, and turning and gluing together the two extremities of the branches of the U, in order to complete the facing of the entire perimeter of the band of cellular material, and maintaining the assembly under pressure during final polymerization of the resin of the facing layer.

According to another characteristic of the invention, a wide band of material such as cellophane is used, onto which is distributed a resin which is brought into contact with the mat or netting of fibers for the facings and edges, and a narrow band is provided laterally which is also brought into contact with the resin and fibrous mat or netting, this letter narrow band being removed before turning the extremity of one branch of the U into adhesive contact with the edge of the core, preparatory to the turning of the extremity of the other branch, to permit adherence of the two extremities, one to the other, and to the edge of the core.

The invention also contemplates an apparatus for executing this method of facing the central band of cellular material in its entirety with a single integral facing sheet. This apparatus comprises supply members for the two wide and narrow cellophane bands, a distributor delivering the resin onto the wide band, a supply of the mat or netting of fibers, a pregelification heating chamber into which the mat and bands of cellophane pass, rollers for guiding and shaping the mat into a U-form, rollers applying the end and the legs or branches of the U, onto the top and lateral surfaces of a continuous band or long lengths of cellular material, a roller applying the extremity of one of the branches of the U on the not-yet-covered bottom surface of the central band, a member removing the narrow cellophane band, a roller applying the other extremity of the U to make it adhere onto the first, and pressing sheets assuring good adherence of the assembly of the facing on the foam, and its maintenance in shape during polymerization of the resin of the facings and edges.

Another aim of the invention is the production of composite panels having generally the characteristics described above but in addition embodying, on at least one surface, a sheathing formed of ceramic materials, such as a mosaic of glass paste or the like. These self-bearing panels are suitable for wall curtains or screens, or partitions for kitchens, hospitals, bathrooms, etc., as well as for the construction of floors.

The second large surface of these panels may be constituted by a resinous layer such as a polyester reenforced by glass fibers, with the optional inclusion of fillers, or a layer of epoxy resin and the like. The two facings, respectively of ceramic material and a resinous laminate, are separated while being joined by the central part of the cellular product, which may be formed of a phenol foam or polyurethane foam, or even a polystyrene foam. It is another characteristic of the invention that the resinous layer forming the second large surface of the panels also constitutes the sheathing for the edges of these panels. It is advantageous to join the rims of these edges of this resinous layer with the bottom surface of facing of ceramic material, by the portions which are turned into contact with said bottom surface.

It is also the object of the invention to obtan composite structural panels including a ceramic facing, by bringing a laminated resinous sheet designed to constitute one of the facings, into contact with the prefabricated central core of cellular organic or mineral material in the form of a continuous band or a series of bands of great length; bringing into contact with the other surfaces of the cellular band, the elements of ceramic material, after having added to these elements a reenforcing sheet impregnated with resin which is adapted to come into contact with said central cellular core; and having the assembly travel between two parallel conveyor belts which assure union of the facing sheets with the central cellular core, and the polymerization of the resins.

According to another characteristic of this development of the invention, designed to obtain panels the edges of which are also sheathed by the resin layer, one begins with a sheathing band of a resinous layer having a width greater than the summation of the dimensions constituted by the width of the central cellular core and its two edges, the two sides of this resinous layer being raised after having brought the central portion thereof into contact with one surface of the central cellular core, and these raised sides being applied to the opposite edges of the latter.

The ceramic facing may be formed of small tiles glued previously to a pliable sheet, such as a sheet of paper.

The reenforcing band carried on the ceramic facing may be constituted, for example, by one or several glass fiber screens or netting, by a mat of glass fibers, or again by a wire netting constituted by a grillwork, or a cloth of fine mesh.

In the several preceding examples of the invention it is necessary to pass the assembly composed of the core of cellular material and the facing laminates, between two parallel conveyor belts in order to obtain a good adherence and a good surface appearance. During this passage, the product acquires its thickness, with resilience near the core of cellular material, and it is necessary that the conveyor belts exert on the product a certain pressure which must be distributed uniformly. Therefore, it is desirable that the band or core of cellular material have a very uniform thickness, and that the bands forming the facings are not too thin, so as to make up the tolerances on the thickness of the cellular core. These imperatives are not always easy to obtain, and it is often necessary to resort to considerable machining of the core of cellular material.

It is the object of the invention to overcome this disadvantage and to avoid the difficulties in regulating the pressing machine consisting of the two conveyor belts, which give rise to the pressure on the assembly of facings and the core of cellular material. This is done by providing an intermediate flexible material between each of the large surfaces of the core of cellular material and its facing to compensate for irregularities in thickness of the core of cellular material. This intermediate material may have a thickness of between 2 and 25 mm., for example. It may be applied either on the cellular material or on the facings. In the case where the surface of the foam is very rough, or if it is slightly brittle or dusty, it is preferable to apply the intermediate material to the cellular material rather than to the facings. It is particularly advantageous to use a foaming material for the intermediate layer, which is capable, after application, of increasing in volume in considerable proportions, and which, in the course of its expansion, comes to occupy the entire space between the two facings in contact with the conveyor belts and the cellular material constituting the core of the product. A polyurethane cream, especially, may be used.

The facings are advantageously composed of layers or laminates of resins with fillers, such as polyesters, for example, the polymeriaztion of these resin laminates taking place during their passage between the two conveyor belts at the same time as the occurrence of the polymerization of the layers of intermediate material, such as polyurethane cream. During this simultaneous polymerization of the two materials, they become glued together perfectly, and a composite product is formed at the outlet of the machine by a series of five layers, each having well-defined properties. The two outer layers constiute the facings of material which are sufficiently rigid to confer mechanical resistance to the assembly. The two intermediate layers may advantageously be constituted by a foam having better mechanical characteristics than the foam forming the core of the panel, which is supplied in the form of a quite thick continous slab. In particular, the modulus of elasticity and the resistance to compression of the foam constituting the intermediate layers, preferably should be greater than these characteristics of the central core of foam. Under these conditions, in case of bending stresses, deformation of the product is slight; shearing stresses, by contact of the different layers, are likewise reduced; and the adherence between the different layers is perfect. Mechanical stresses or stresses due to temperature variations occasion no risk of causing separation or ungluing of the different layers.

Other characteristics and advantages of the invention will appear from the description which follows with reference to the attached drawings which show different embodiments of the invention constituting illustrative examples thereof, wherein.

Figure 1:
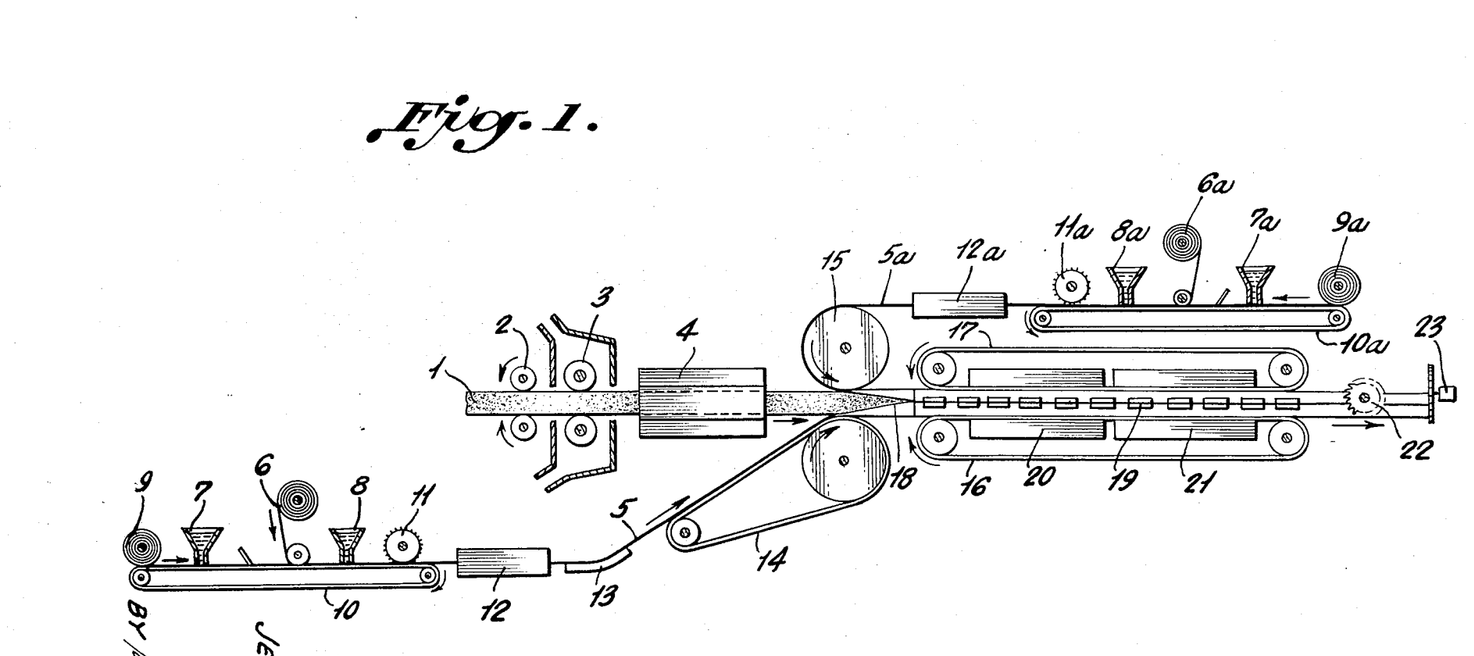
FIG. 1 is a schematic front elevation of an apparatus for covering a central band or core of cellular material with a pair of facing sheets.

The apparatus shown in FIG. 1 is designed especially for the continuous manufacture of composite panels formed by a central band of foam of rigid plastic material, for example, polyurethane or "Phenoplast," with the coatings or facings being formed of layers of laminates of polyester and glass fibers. In the example under consideration, the sheathing of the foam core is applied on both surfaces of the latter.

In FIG. 1 is shown the foam band 1 advanced continuously by rollers 2. It passes into a rectifying device 3 which machines its two large surfaces in order to obtain good smoothness and uniform thickness. It then passes to station 4 where it is conditioned in temperature before entering the continuous pressing device, which is also supplied with the two resin-impregnated mats which are to constitute the coatings or facings of the composite panel.

The sheathings or facings 5, 5a are formed by the impregnation of mats of glass fibers 6, 6a, with resin fed from containers 7, 7a and 8, 8a delivering the resin onto the two surfaces of the respective mats. This formation of the facings 5, 5a, respectively, takes place upon the endless band supports 10, 10a, upon the inlet ends of which are disposed reels of plastic sheeting such as cellophane, 9, 9a, respectively. This sheeting does not adhere to the resin of the facing, and can be removed easily when it leaves the machine. Instead of such a removable plastic sheeting, a thin support which adheres to the resin of the facing may be used, which is retained and which forms part of the final product. This support may be constituted, for example, by a netting of resin coated on one surface with polyfluoroethylene or polychlorofluoroethylene.

A thin layer of resin may also be deposited between the cellophane and the facings, especially of the same resin as that used for the facings, and of a thickness of about 0.3 mm. for example. The sheet of cellophane may then be removed from, or retained on, the final product.

The impregnation of the mats is followed by a debubbling, by means of bubble-eliminating rollers 11, 11a, so as to eliminate the air imprisoned in the impregnated product. The polyester is then gelified in the heating chambers 12, 12a, respectively.

The lower impregnated mat 5 passes over a guide 13, then over an endless conveyor 14 which conducts it under the lower surface of band 1. The impregnated upper mat 5a passes onto roller 15 which reverses the mat and effects its return, in order to bring it onto the upper surface of band 1.

The continuous press into which the assembly is introduced is formed of two endless conveyors 16, 17. These conveyors are each advantageously formed by a continuous belt capable of assuring a suitable pressure which may be of the order of about 500 grams per square cm., and capable of giving a good surface appearance to the two facings.

If, as stated above, it is also desired to cover the two lateral sides of the band, lateral guides or shapers 18 and pincer devices 19 are provided, which act on the two edges of the facings. The pincer devices may consist of pincers attached to chains which turn in a horizontal plane.

During the first part of continuous pressing, a heating device 20 permits the start of polymerization of the polyester. A controlled cooling device 21 then permits the assembly to be cooled, while the product is always maintained under pressure.

At the outlet of the continuous press, an accelerated cooling device may be provided as well as a triming device 22 which permits lateral trimming of the edges. A sawing device 23 permits cutting of the resultant composite band into panels of the desired length.

Figures 2, 3, 4:
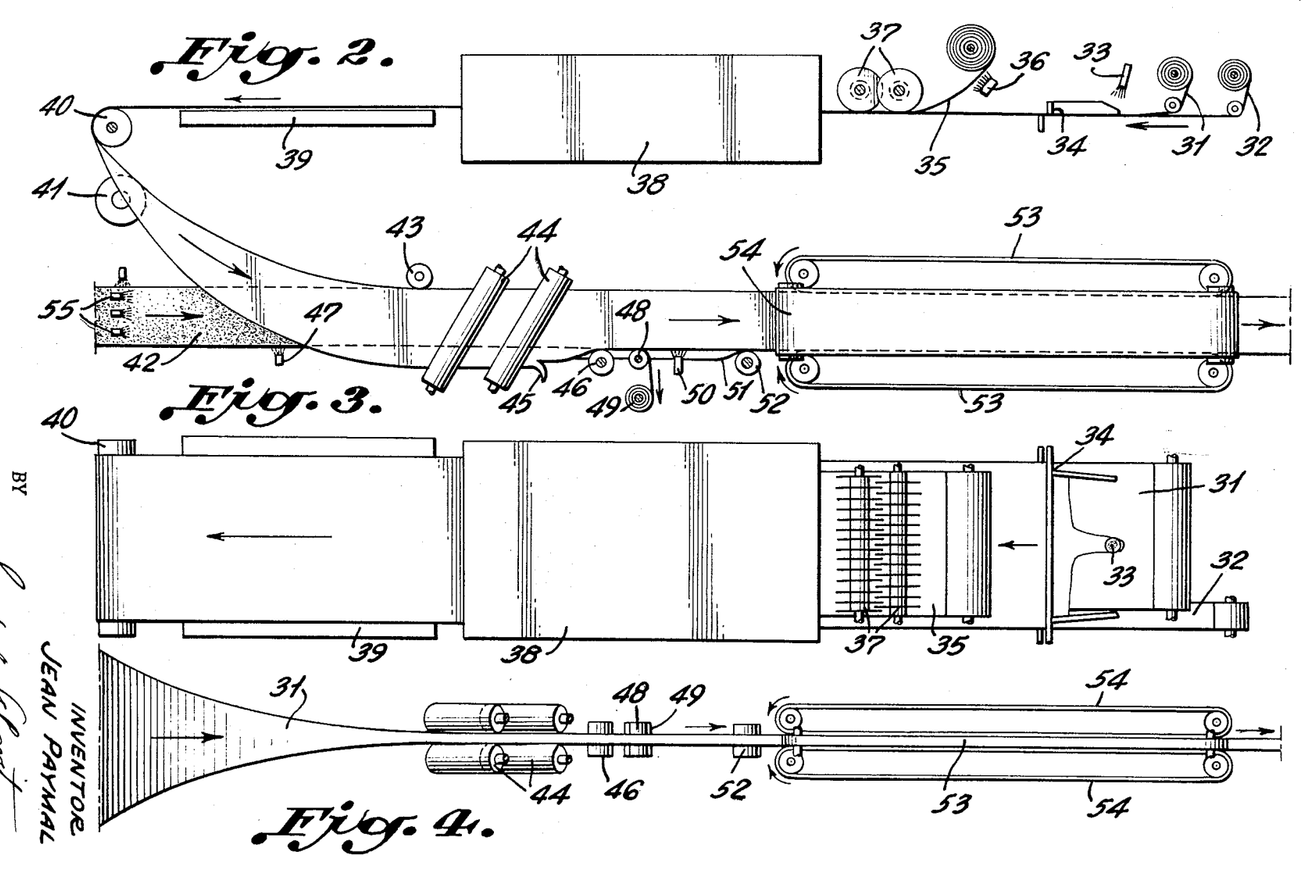
FIG. 2 is a schematic front elevation of an apparatus for covering a central core of cellular material on both its surfaces and its edges with a unitary facing sheet.
FIG. 3 is a plan view of the upper portion of FIG. 2, whereat the unitary facing sheet is prepared.
FIG. 4 is a plan view of the lower portion of FIG. 2, whereat the unitary facing sheet is applied to the central core.

In the embodiment of the invention illustrated in FIGS. 2 to 4, the cellophane band 31, the width of which is almost equal to the entire width of the fiber mat which is to encompass entirely the faces and the edges of the panel, unrolls in continuous fashion. Another cellophane band 32 of small width also unrolls continuously and is positioned under one side of the band 31. This band 32 completes the desired width, and is removed just as the two edges of the mat come into adhering engagement on one edge of the panel.

A resin is sprinkled onto the cellophane bands at 33 and a scraper 34 assures the formation of a layer of resin of uniform thickness on said bands. The mat or pad of mineral fibers 35, particularly glass fibers, unrolls continuously to come into contact with bands 31 and 32 with the resin deposited thereon. The mat, if desired, may be preheated, for example, by means of an infra-red radiant heater 36. Impregnation of the mat by the resin is aided by discs 37 which precede a pregelification heater 38, in which the assembly is heated to a suitable temperature about 60° C. for example, for a polyester resin.

Upon leaving heater 38, the resin-impregnated mat passes over a cooler 39, which arrests the gelification. It unrolls horizontally as far as roller 40, where it undergoes a change in direction; then under the action of rollers such as 41, it assumes the form of a V, then an inverted U, and caps the central band 42 of cellular material, which is narrow and is presented on edge. A roller 43 applies the end of the U onto the small upper edge surface of the central band 42, and rollers 44 apply the legs of the U onto the large plane surfaces of the band 42, these rollers being inclined so as to pull the legs of the U downward.

The two edges of the resin-impregnated mat are cut at 45 to render them even or coincident. One of these edges is turned at 46 to lie on the small bottom edge of the core 42 where it remains affixed by virtue of the glue which has been deposited on this edge by spray gun 47. The narrow cellophane band 32 is removed at 48 and may be wound up at 49 and re-used. This band 32 may be formed of a more resistant material than that constituting band 31, in order to avoid tearing, when it is removed and wound at 49. If the mat impregnated with resin is in a sufficiently advanced stage of gelification, it may be useful to proceed to a second gluing at 50, in a manner to permit gluing of the second extremity of the arm of the U which is turned up at 51 and is applied at 52 onto the first end of the leg of the U which has just been glued at 46. Thus, a complete sheathing of the core of cellular resin is effected by the fiber mat impregnated with resin, which is glued onto itself.

The assembly next passes into a pressing device constituted by two endless pressing belts 53 acting on the small edge surfaces, and by two endless pressing belts 54 acting on the large surfaces of the core. This pressing device assures good adherence of the sheathing to the foam core at the large surfaces and edges of the latter, and maintains the assembly in shape during polymerization of the resin, which takes place in this device. The latter should be heated so as to initiate the polymerization of the resin and its final hardening. The resultant product may be cut transversely at the outlet of the pressing and heating device to obtain panels having the desired lengths.

It may be necessary, in order to promote the adherence of the resin-impregnated mat of fibers on the band of cellular material, to cover the latter with an intermediate pulverized product at 55, which may also be applied, if desired, by means of an ink-roller. This product may be a resin of the same type as that which impregnates the mat of fibers, or a resin of different type, or a suitably selected glue. As for example, in the case of uniting panels of expanded polystyrene with sheathings of polyester resin at the faces and edges, it is suitable to use a glue that provides a protecting layer for the polystyrene, and avoids direct contact between it and the polyester. In this case, aqueous emulsions of polyvinyl acetate, for example, may be used, which contain fillers to a greater or lesser degree. When the cellular material is constituted by a phenolic foam, an epoxy resin or rubber glue may be used. A coating of polyurethane may be used to advantage on polyurethane foams.

The invention described above is applicable not only to the fabrication of panels having quite a large width with respect to their thickness, but also to pieces of less elongated section, for example, square-shaped or even round. In the latter case, rollers 44, 46 and 52 should be replaced by narrow rollers with concave profiles in suitable numbers.

Figure 5:
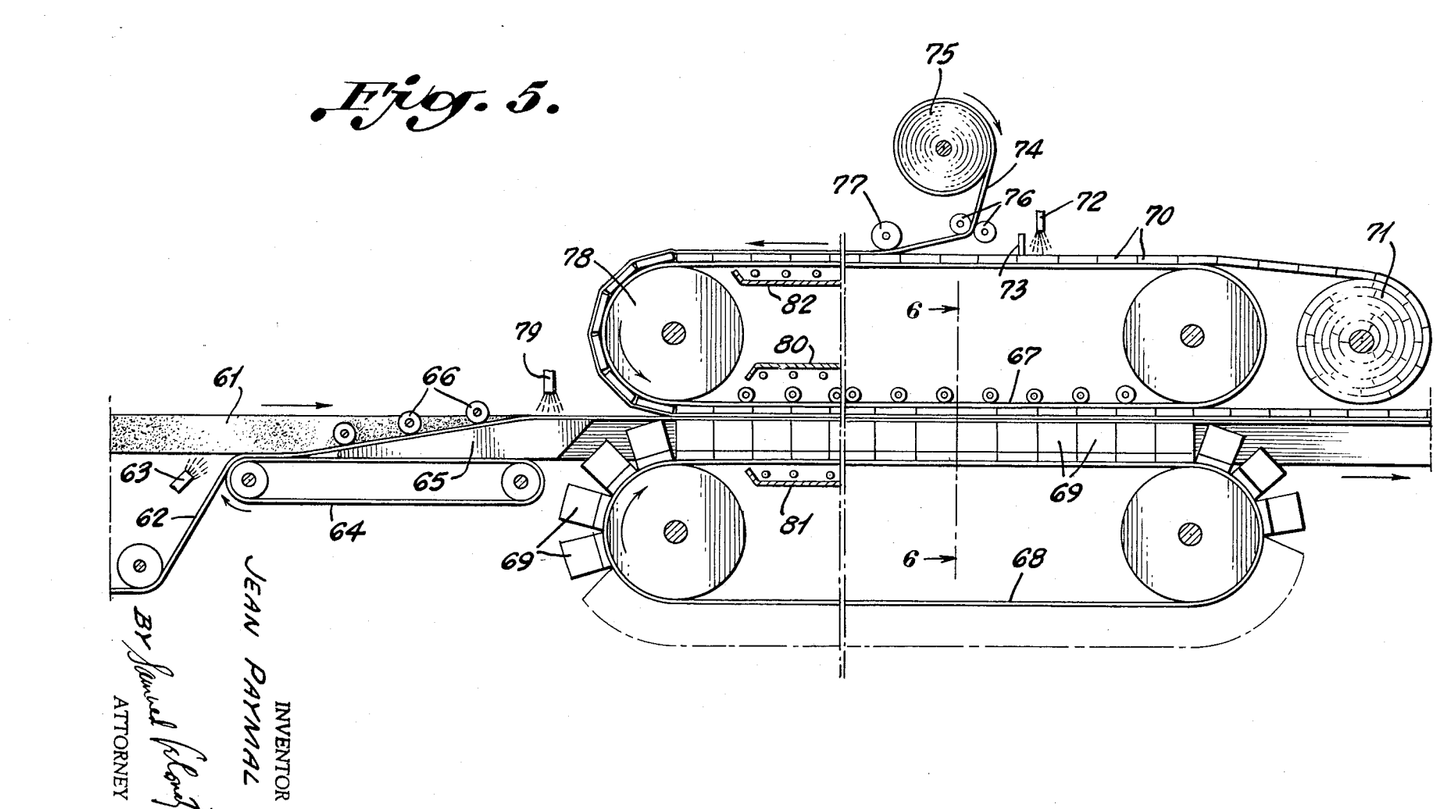
FIG. 5 is a schematic front elevation of an apparatus for covering one surface of a central core of cellular material with a facing of ceramic material.

In the apparatus shown in FIG. 5, the band or core 61 of cellular material is supplied continuously from a fabricating machine located in advance, or is constituted of very long elements placed end-to-end, said elements being preferably glued together so as to form a continuous plank. This band is thoroughly dusted or vacuum cleaned, if necessary, and presents as uniform a thickness as possible. It may be advantageous to heat this band, especially in the case where a resin is used which has a high shrinkage characteristic during polymerization. In fact, during cooling, the band of cellular material tends to shrink, and this heating helps avoid shearing stresses between the resin foam of the band and the facings.

A layer or laminate 62 of glass fibers, impregnated with resin, and supported by a cellophane sheet is introduced below the band 61. The width of this layer is greater than the width of the band 61. If the resin is sufficiently thixotropic, it is not necessary to pregelify it. Spray guns, such as 63, may be provided, which project fresh resin over the bottom surface of the band 61 as well as over the sides thereof.

The layer 62 is applied to the bottom surface of band 61 by an endless belt 64. Its borders are then raised over the sides of band 61 by means of shaping guides 65, at the same time that the small rollers 66 act on these borders in order to turn them in. The periphery of these small rollers may consist of a material which does not adhere to the laminate, for example, rubber or silicone. At this stage of fabrication, the band 61 of cellular material is enveloped on three surfaces by the resin laminate 62.

The assembly then enters the compression device formed essentially of two parallel endless conveyor belts 67 and 68. The upper conveyor 67 comprises, for example, a metallic band of stainless steel, and the lower conveyor may be advantageously constituted by a belt of metallic sheets or plates bearing at their extremities squares 69, whose form corresponds to those sides of the panel which is sought to be obtained (FIG. 6).

On the other hand, the sheathing carrying the ceramic, has been prepared at the upper part of the installation, this sheathing being composed, in the example under consideration, of small tiles 70 previously glued to a support, such as paper, or a combined paper and plastic film sufficiently strong to allow the entrainment of the assembly of ceramic tiles. These tiles with their support unwind from a roll 71.

A resin is deposited on the ceramic tiles at 72, and a scraper 73 effects its distribution over the entire width. A mat 74 of glass fibers supplied from a roll 75 and passing between rollers 76 is brought into contact with the resin deposited on the tiles. A bubble-eliminating device 77 tends to make the mat 74 penetrate the resin. A slight pregelification may be necessary to fix the quantity of resin which enters the eventual interstices which may be formed between the ceramic tiles. This precaution is useful because of the deformation to which the ceramic facing is subjected in the course of its reversal on drum 78 for the purpose of bringing it into contact with the upper surface of band 61. In fact, during this reversal, the interstices between the tiles tend to take the shape of corners or wedges, and if a supplementary or additional quantity of resin enters them, it can given rise to a dislocation of the band of tiles when the latter ends its turning movement in order to resume the plane position in overlying relation to the core 61.

Figure 6:
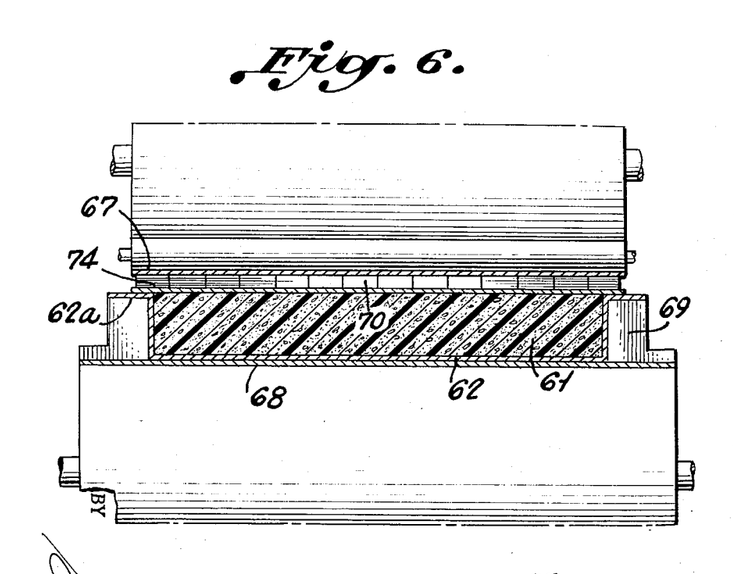
FIG. 6 is a transverse sectional view along line 6—6 of FIG. 5.

Following the travel on the drum 78, the ceramic facing sheet with its reenforcement of resin and glass fibers, comes into contact, on the one hand, with the upper surface of the band of cellular material 61, and on the other hand, on each side of the latter, with the bent-in edges 62a of layer 62 constituting the lower facing (FIG. 6). The edges 62a constituting flanges are held in place by square 69 attached to the plates of the lower conveyor 68.

A supplementary resin atomizing device 79 may be provided on the upper part of the band 61 of cellular material, particularly if the latter has a very rough or even a slightly dusty surface.

The assembly of the band 61 and its sheathings is subjected to a re-heating in the course of its passage between the two conveyors 67 and 68, which initiates the polymerization of the resin which is comprised by said facings. Heating means, such as infra-red radiators 80, 81 are provided for this purpose. The ceramic facing with its glass fiber mat impregnated with resin may be previously heated, for example, by infra-red ray radiator 82.

It is advantageous to maintain a sufficiently high pressure during polymerization in order to obtain both a good surface condition and to decrease stresses capable of occurring as a result of the shrinking corresponding to the polymerization. The pressure exerted perpendicularly to the plane of the assembly, in effect, permits the shrinkage to take place in this direction, that is, in the direction of the thickness of the two facings and not along the plane of the facings, which would occasion the risk of provoking shearing stresses and consequently separation and ungluing of the laminates.

A shearing device may be positioned at the outlet end of conveyors 67 and 68, similar to that shown in FIG. 1, which permits the obtention of panels having the desired lengths.

Figure 7:
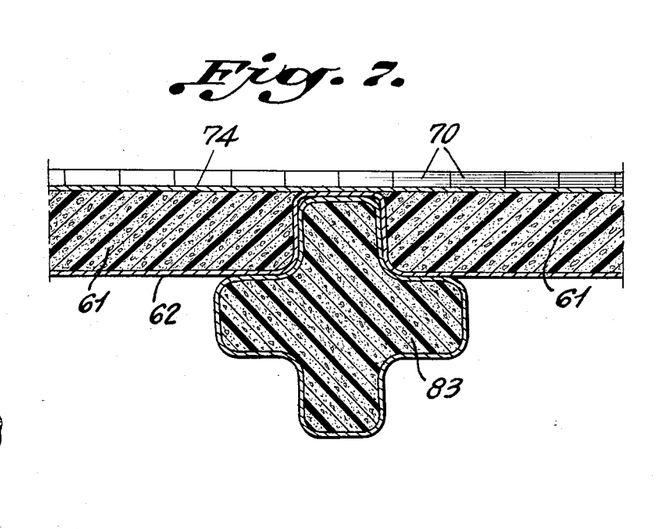
FIG. 7 is a horizontal sectional view of the composite panels produced by the arrangement shown in FIG. 5, mounted on posts to form a wall construction.

In the case of the utilization of this type of panels for wall fronts, it may be interesting and advantageous to fasten them on posts 83 (FIG. 7), which are made of insulating material so as to avoid thermic bridges which might arise from metallic cross-sections.

Figure 8:
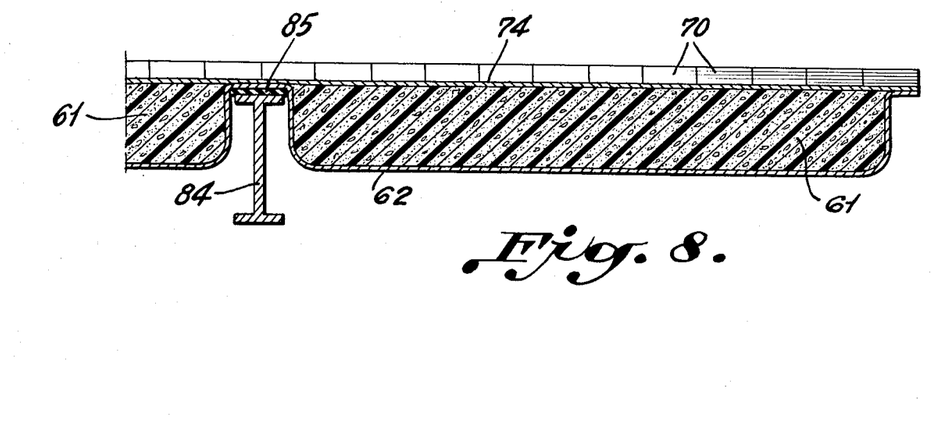
FIG. 8 is a vertical sectional view of a flooring construction mounted on beams or girders, and embodying the composite panels produced by the arrangement shown in FIG. 5.

If these panels are used as flooring elements they may rest on metallic sections 84 (FIG. 8), by interposing a plate 85 of resilient material between the upper part of these sections and the lower part of the panel flanges, which avoids transmission of impact noises to the story or level below.

Figures 9, 10, 11:
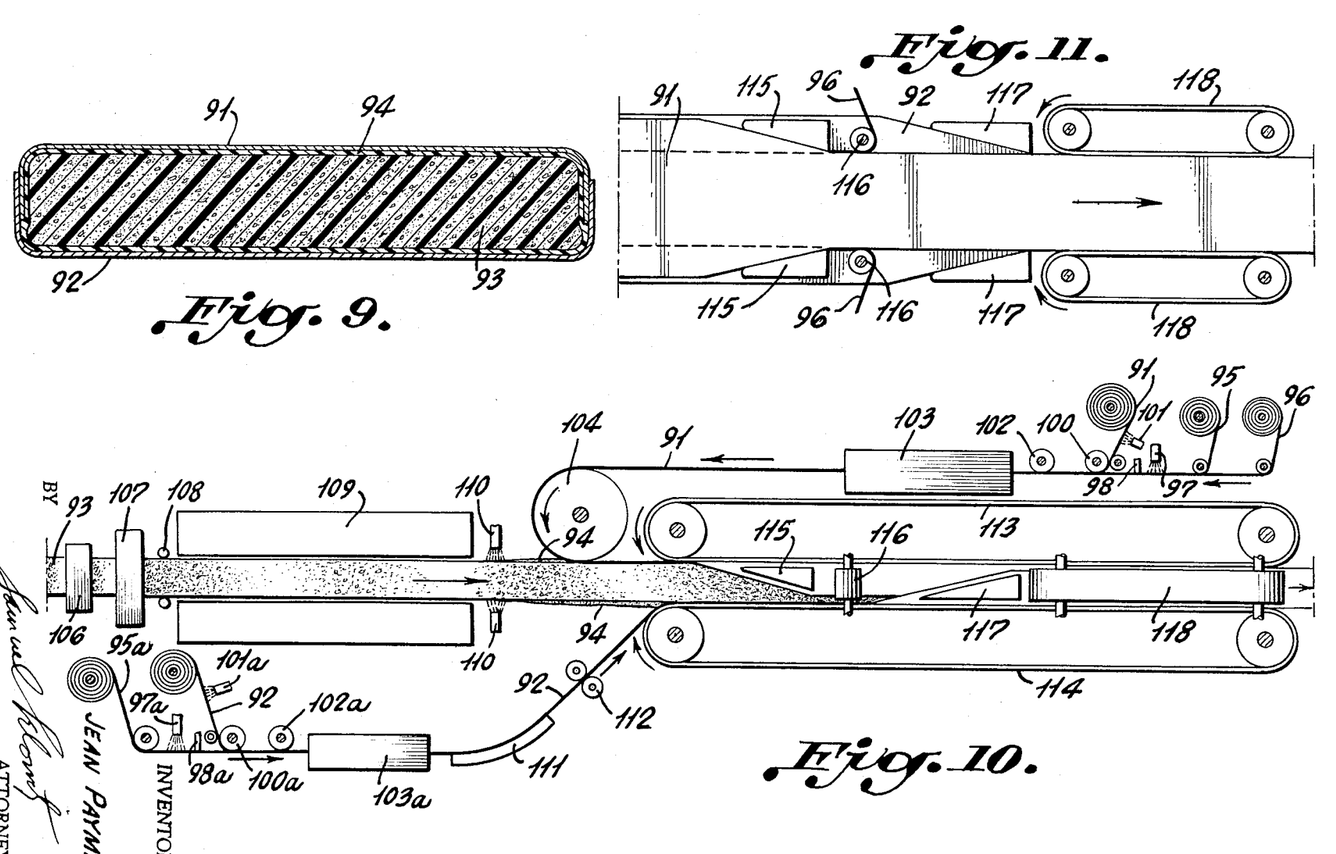
FIG. 9 is a vertical sectional view of a composite panel in accordance with the invention which embodies intermediate layers of flexible material between the core and facing layers.
FIG. 10 is a schematic front elevation of an apparatus for producing the composite panel shown in FIG. 9.
FIG. 11 is a schematic partial plan view of FIG. 10.

FIGS. 9 to 11 illustrate the improved panel which incorporates intermediate layers of flexible material between the core and facing layers, and the apparatus for producing such.

In FIG. 9, the panel comprises an upper sheathing 91 forming a facing, a lower sheathing 92 forming the other facing, a core of cellular material 93 and a layer 94, for example, of foam, interposed between each facing and core 93. In the particular illustrated embodiment, the upper sheathing 91 is turned down over the two edges of the panel and the lower sheathing 92 itself is raised upward and glued to the turned-down parts of the upper sheathing. In this example, the core of cellular material 93 is thus enclosed in a shell constituted by the sheathings 91 and 92 forming the facings and the edges. The resin of the sheathings 91 and 92 and the foam constituting the intermediate layer 94 are polymerized simultaneously. The core 93 of the panel of cellular material is fabricated elsewhere by other means.

The constituent materials of this assembly may be principally the following: the facings may be formed of a reenforced resin with optional fillers, such as polyester resins or epoxy resins; the intermediate layers may be formed of a product which experiences or permits foaming in situ, such as polyurethanes to which may be added filler ingredients; the previously fabricated central cellular core may be formed of a polyurethane foam of relatively small density, for example, 40 kilograms per cubic meter, a phenolic foam of similar density, or lighter, of the order of 20 to 30 kilograms per cubic meter, a polystyrene foam of a density between 8 and 30 kilograms per cubic meter, or even a polysulphonic foam.

The material comprising the core of the panel may also be constituted by a material which is itself composite. For example, a mixture of plaster and polystyrene may be used, this material having the advantage of imparting a very high heat-resistant capacity to the panel. This property is interesting, especially in summer, in building constructions which are not air-conditioned, by causing sufficient accumulation of the cooling effects of the night temepratures so that these do not rise too high in the daytime inside the premises. Such a material also has the advantage of better sound insulation with respect to airplane noises. Moreover, it is generally less costly than materials which are listed below. A material such as that disclosed in applicant's French Pat. No. 1,506,460, may also be used.

FIGS. 10 and 11 show schematically an arrangement for producing the composite panel shown in FIG. 9.

In FIG. 10, a supply of cellophane sheeting 95, the width of which is almost equal to the entire width of the band which is to constitute the upper facing of the panel, unwinds in continuous fashion from a supply reel. Two other cellophane bands 96 of small width also unwind in continuous fashion and are positioned below the two sides of band 95. These bands 96 complete the desired width of the facing, and are removed at the time that the opposite sides of the two bands of the facing are glued to one another.

A resin is poured over the cellophane bands at 97, and a scraper 98 assures the formation of a uniformly thick layer of resin on said bands. A mat of fibers 91, particularly glass fibers, unrolls in continuous fashion, and is brought into contact with the coated cellophane bands 95 and 96 by the action of a roller 100. This mat may be preheated, for example, by means of an infra-red radiant heater 101. The assembly then passes under de-bubbling discs 102 and into a pregelification heating chamber 103, in which it is heated to a suitable temperature, about 60° C. for example, for a polyester resin. The resin-impregnated fiber mat 91 passes over a roller 104 and is directed thereby in a reverse direction in parallel to its original travel.

The band or core 93 of cellular material advances from the left end of the apparatus and first undergoes a machining only on the edges, for example, by means of a planing machine 106 for the sides. The core then passes into a dust-removing suction device 107, and between rollers 108, before entering into a preheating chamber 109. Spray guns 110 atomize a polyurethane cream 94, or any other suitable foaming resin, over the entire surface of core 93.

The prefabricated band 93, constituting the central core, on the surface of which has been deposited a layer of material 94 for constituting the intermediate layer, is brought into contact on its upper surface with the fiber pad 91 impregnated with resin. It is also brought in contact on its lower surface with a fiber pad 92 impregnated with resin issuing from devices similar to those described above. These devices comprise a cellophane band supply 95a, the width of which is substantially equal to that of fiber pad 92, a resin distributor 97a, a scraper 98a, a heating device 101a, for example, an infra-red radiant heater, a roller 100a, debubbling discs 102a under which passes mat 92 impregnated with resin, and a pregelification heater 103a. Mat 92, impregnated with resin, passes over a guide 111 and into rollers 112 which direct it toward the lower surface of band 93.

The assembly, consituted by stratified layers 91 and 92 with the cellophane bands integral therewith, and core 93 of cellular material covered with layer 94, passes between two conveyor belts 113 and 114 constituting a continuous press. Guiding members 115 are disposed laterally with respect to this press on the opposite sides thereof (FIG. 11), and bend down the two opposite sides of stratified layer 91 onto the small surfaces or edges of core 93. After this turning down, stripping rollers 116 remove lateral cellophane bands 96 which now are above cellophane band 95 in view of the reversal of the upper facing layer. Other guide members 117, located beyond these rollers 116, lift the two sides of stratified layer 92 in order to apply and glue them on the turned-down sides of stratified layer 91. This gluing is effected between the lateral conveyor belts 118 which are disposed beyond the points or turning the borders of the facing layers for juxtaposed contact.

The passage of the assembly between conveyor belts 113, 114 and 118 which assure continuous pressing, makes possible good adherence of the sheathing to the foam core at the faces and edges of the panel, and hold it in shape during polymerization of the resin forming part of the facings and the intermediate layer, this polymerization being accomplished in this device. The latter should be heated in such a way as to launch the polymerization of the resin and its final hardening. The resultant product may be cut transversely at the outlet of the machine in order to obtain panels of any desired length.

It should be understood that the invention is not limited to the preceding methods of operation. Thus, in particular, because the intermediate layer between the core of cellular material and facings assures a bond between the core and the facings, it is possible to effect a vigorous pregelification of the resin of the facings, which in certain cases may even be almost complete before association with the core.

I claim:

1. The method of continuously producing composite structural panels which comprises
    (a) feeding continuously a prefabricated band of rigid cellular material to form the core of said panels,
    (b) forming a unitary sheet of heat-hardenable resinous plastic material, reenforced with mineral fibers, such as glass fibers, having a width at least as great as the perimeter of the section of the finished structural panels, which comprises preparing the unitary sheet of plastic material in a substantially horizontal plane by depositing the resin and fiber-reenforcement components of said sheet on a continuous running length of inert plastic sheeting serving as a support for said resin and fiber components.
    (c) pregelifying said unitary sheet of material in the course its travel toward said band of cellular material,
    (d) covering said prefabricated band of rigid cellular material on the opposite surfaces and lateral edges thereof which comprises,
    (e) feeding the band of cellular material on edge in a vertical plane,
    (f) reversing the supporting sheet of inert plastic to position it uppermost while it and the unitary sheet of plastic material supported thereby are folded in the shape of an inverted U to cap one edge of the band of cellular material while the legs of the U are brought into juxtaposition with the large vertical surfaces of the band of cellular material with the lower edges of the U projecting below the lower edge of said band of cellular material,
    (g) turning up said projecting edges into juxtaposition with the lower edge of said band, the first one in adhesive contact therewith and the second one in adhesive contact with said first one, preparatory to the final pressing and polymerization steps, and
    (h) pressing said sheet to said cellular material and simultaneously polymerizing the resinous plastic material in the course of said pressing operation to join said band and sheet together in tightly bonded relation.

2. The method set forth in claim 1, including the step of trimming the bottom edges of the U-shaped sheet before turning up said edges into juxtaposition with the lower edge of said band.

3. The method set forth in claim 1, including the step of pressing the several portions of the unitary sheet of plastic material to the edges as well as the large surfaces of the band of cellular material between endless traveling belts for the execution of the final pressing and polymerizing operations.

4. The method set forth in claim 1 wherein the preparation of the unitary sheet in a horizontal plane includes the deposition of resin and fiber reenforcement on a continuous running length of a border strip of inert plastic sheeting which is separable from the rest of the supporting inert plastic sheet, the step of removing said border strip from the edge of the leg of the U which is turned up first, to provide a clear resin and fiber surface for adherence thereto of the second turned-up edge of the U-shaped sheet, to effect the homogeneous and complete bonding of the facing layers at the bottom edge of said band.

5. The method set forth in claim 4 including the step of removing the inert plastic sheeting from the finished panel following the pressing, polymerization and cooling of the finished panels.

6. The method of continuously producing composite structural panels which comprises
    (a) feeding continuously a prefabricated band of rigid cellular material to form the core of said panels,
    (b) forming a sheet of heat-hardenable resinous plastic material by
    (c) advancing an integrated length of ceramic tile,
    (d) depositing the heat-hardenable resinous plastic material onto said traveling length of ceramic tile in conjunction with a reenforcement therefor comprising mineral fibers, such as glass fibers,
    (e) pregelifying said sheet of material in the course of its travel toward said band of cellular material,
    (f) covering the upper surface of said band with said sheet of resinous plastic material by reversing the direction of travel of the length of ceramic tile to place it in reversed uppermost position before directing it onto overlying relation to the upper surface of said band of cellular material which comes into contact with the layers of reenforced resin,
    (g) advancing a second sheet of reenforced plastic material into contact with the bottom surface of said band of cellular material, and
    (h) pressing said sheet to said cellular material and simultaneously polymerizing the resinous plastic material in the course of said pressing operation to join said band and sheet together in tightly bonded relation.

7. The method set forth in claim 6 wherein the last-mentioned step includes turning upwardly the opposite borders of the second sheet of reenforced plastic material into contact with the opposite edges of the band of cellular material.

8. The method set forth in claim 6 wherein the reenforcement for the resinous material deposited on the traveling length of ceramic tile is selected from the group consisting of glass fiber screening, or netting, a mat of unwoven fibers, metallic wire netting and cloth of fine mesh.

9. The method set forth in claim 6 wherein the second sheet of reenforced plastic material is of a width greater than the sum of the width and the height of two edges of the band of cellular material, and is pressed into contact with these surfaces as well as the underside of the first sheet of plastic material bearing the ceramic tile projecting on each side beyond the opposite edges of said band of cellular material.

10. The method of continuously producing composite high-load-bearing structural panels which comprises
    (a) feeding continuously a thick prefabricated band of rigid surface-machineable gas-foamed cellular material to form the core of said panels,
    (b) forming a sheet of heat-hardenable resinous plastic material and reinforcing it with mineral fibers, such as glass fibers,
    (c) pregelifying said sheet of material in the course of its travel toward said band of cellular material,
    (d) covering said band on the opposite faces thereof with said sheet of reenforced plastic material,
    (e) interposing a layer of flexible material between the opposite faces of said band and said covering layers, and
    (f) pressing said sheet to said cellular material and flexible material and simultaneously polymerizing the resinous plastic material in the course of said pressing operation to join said band, layer and sheet together in tightly bonded relation.

11. The method of continuously producing composite high-load-bearing structural panels which comprises
    (a) feeding continuously a thick prefabricated band of rigid surface-machineable gas-foamed cellular material to form the core of said panels,
    (b) forming a sheet of heat-hardenable resinous plastic material and reenforcing it with mineral fibers, such as glass fibers,
    (c) pregelifying said sheet of material in the course of its travel toward said band of cellular material, (d) covering said band on the opposite faces and lateral edges thereof with said sheet of reenforced plastic material, (e) interposing a layer of flexible material between the opposite faces and lateral edges of said band and said covering layers, and (f) pressing said sheet to said cellular material and flexible material and simultaneously polymerizing the resinous plastic material in the course of said pressing operation to join said band, layer and sheet together in tightly bonded relation.

12. The method set forth in claim 11, wherein the interposed layer of flexible material is formed by depositing a foaming material between the band of cellular material and the sheets of plastic material to produce a layer of flexible material therebetween.

13. The method set forth in claim 12 wherein said foaming material is deposited on the band of cellular material.

14. The method set forth in claim 12 wherein said foaming material is deposited on said sheets of plastic material.

15. The method set forth in claim 11, wherein the interposed layer of flexible material is formed by depositing a foaming material between the band of cellular material and the plastic material to produce a layer of flexible material therebetween, said foaming material constituting a resin foam adapted to produce a cellular product having better mechanical properties than the cellular material of the band constituting the core of the panel.

16. The method set forth in claim 15 wherein the formation of the flexible layer by foaming is executed in the course of the final pressing step simultaneously with the polymerization of the resinous plastic material in the facing sheets of plastic material.

References Cited
UNITED STATES PATENTS

| | | | |
|---|---|---|---|
| 2,731,068 | 1/1956 | Richards | 156—324 |
| 2,784,763 | 3/1957 | Shorts | 156—324 X |
| 2,866,730 | 12/1958 | Potchen et al. | 156—78 X |
| 2,931,751 | 4/1960 | Du Fresne | 156—299 |
| 3,050,109 | 8/1962 | Monaco | 156—324 |
| 3,174,887 | 3/1965 | Voelker | 156—202 X |
| 3,207,831 | 9/1965 | Geller | 156—202 |
| 3,269,882 | 8/1966 | Willy | 156—78 |
| 3,109,763 | 11/1963 | Finger | 156—374 X |
| 3,144,376 | 8/1964 | Plumberg et al. | 156—374 X |

SAMUEL W. ENGLE, Primary Examiner

U.S. Cl. X.R.

156—374, 555; 161—160